UNITED STATES PATENT OFFICE.

JOHN CARNRICK, OF NEW YORK, N. Y.

SOLUBLE FOOD FOR INFANTS AND INVALIDS.

SPECIFICATION forming part of Letters Patent No. 375,601, dated December 27, 1887.

Application filed October 10, 1885. Serial No. 179,525. (No specimens.)

*To all whom it may concern:*

Be it known that I, JOHN CARNRICK, of New York, in the county of New York and State of New York, have invented certain new and useful Improvements in Children's Food; and I do hereby declare that the following is a full, clear, and exact description of the invention, which will enable others skilled in the art to which it appertains to make and use the same.

This invention relates to a partially-digested soluble food containing the proper proportions of constituents and possessing the qualities of human milk in the most suitable and palatable form for the complete nourishment of infants and invalids; and the object of the invention is to supply, in a convenient and reliable form, a compound which will keep indefinitely and is a perfect substitute for mother's milk—that is, a compound in which the caseine of fresh cow's milk is partially digested and rendered as soluble and as easily digested by the infant as human milk, and the formation of curd or indigestible substance in the stomach to which it is administered is prevented, and in which the starchy portion of wheat is partially digested by conversion into soluble starch and dextrine.

The invention consists in the process of manufacture and the resulting article of soluble food, as hereinafter particularly described, and defined in the claims.

In carrying out my invention I proceed as follows: I take wheaten flour that contains the largest amount of gluten and bake it into crackers. The heat employed in baking converts a portion of the starch into dextrine and soluble starch. In case the conversion of the starch by baking is not sufficient, I reduce the crackers to a moderately-fine powder, so that subsequent heat by steam-pressure will uniformly permeate the substance. This powder is then put into a vacuum-pan containing revolving machinery, which keeps the powder in motion and allows the heat to be distributed equally through it. This operation is continued for six hours, or until nearly one-third of the starch is converted into dextrine, and the remaining starch is converted into what is termed "soluble starch." The wheaten flour may be baked or otherwise heated till the starchy portion is converted into the desired proportions of dextrine and soluble starch. I then take the best quality of cow's milk and remove a part of the fat, (more or less,) and to this I add a watery solution of the pancreas, (preferably of the pig, but that of the sheep or calf may be used,) in the proportion of about a half to one fluid dram, together with from fifteen to twenty grains of bicarbonate of soda to a pint of milk with the cream partially removed, as above described. It is then raised to 130° Fahrenheit and allowed to stand fifteen minutes. It is then heated to 180° or 200° Fahrenheit, for the purpose of destroying the digestive power of the solution of the pancreas, my object being to just sufficiently digest the caseine of the milk to render it as easily digested and as soluble and uncoagulable as the caseine in human milk. I also, in some instances, partially digest the caseine of the cow's milk with pepsin, preferably from the pig, (though pepsin from the stomach of any other animal may be used, such as sheep or calf.) I add to each pint of milk slightly acidulated with hydrochloric acid one dram of powdered pepsin, or two drams of the pepsin in solution, and let it remain for fifteen or twenty minutes at a temperature of 130° Fahrenheit. I then raise the heat to 180° or 200° Fahrenheit, so as to destroy the digestive ferment and prevent further digestion. The acid remaining after the partial digestion is entirely neutralized with bicarbonate of soda.

I desire in my invention to lay great stress upon partially digesting the milk, as before described, and also destroying any further digestive power of the pancreatine or pepsin. If the digestive ferment is not destroyed, the preparation would readily decompose, especially in the summer season, for digestion would continue in the bottle at a temperature as low as 70° Fahrenheit.

It is well known that the caseine in human milk is in such a soluble condition that it will not to any extent coagulate with acids or form into curds or lumps in the stomach of the child. Some leading physiological chemists claim that it is partially a peptone in its normal state. It is also well known that the difficulty experienced by the child in digesting cow's milk, either condensed or otherwise, is that the caseine is of such nature that it frequently coagulates or forms into curds or hard lumps which are partially indigestible, and consequently produces cholera infantum, marasmus, and various forms of stomach and bowel complaints. By this partial digestion of the caseine I render it practically like the caseine of human milk and quite as easily digested. I carry the digestion of the caseine only so far as to bring it into the same soluble condition as in human milk, for it would be highly injurious to entirely supplant the action of the child's digestive functions by wholly digesting the milk. If a food of this kind were wholly digested, nature would soon cease to secrete the digestive ferments, and inactivity of the digestive organs would cause constipations and produce marasmus. After partial digestion the milk is put into the vacuum-pan and reduced to the consistency of honey. At this stage of the operation I add the prepared wheat-powder containing the soluble starch and dextrine, as before described, in such proportions that the compound will contain equal parts of the dry milk and wheat. Evaporation is then continued till all but four or five per cent. of the water is removed. In some instances I continue the evaporation of the milk until it contains four or five per cent. of water and then mix it with equal proportions of the prepared wheat-flour. It is then finely powdered and mixed.

My soluble food has been found by analysis to have the following composition:

```
Fat............................................................5.00
Proteine substances, (albuminoids)..................18.22
Hydrocarbons, (dextrine, &c.).........................67.74
Water..........................................................6.14
Salts and inorganic constituents........................2.99
Amount of nitrogen in proteine substances........2.915
Amount of proteine substances readily digestible..16.45
Proportion of nitrogenous alimentary substances, (proteine=1).
The inorganic constituents contain { Lime.............0.645
                                    { Phosphoric acid..0.874
```

The proportions of the nutritive constituents of this food are almost identically like the proportions of the nutritive constituents of an average sample of human milk. In this analysis I calculate that two or two and one-half parts of soluble starch are equivalent to one part of fat. There are no foods for children in the market that compare in these respects to human milk. It contains from seventeen to nineteen per cent. of albuminoid matter, and it is consequently not necessary for a child to take milk or any other food to completely nourish it. No such degree of perfection has ever been reached by any other food for children. It is necessary to combine all other prepared foods for infants in the market with cow's milk, or the children would be imperfectly nourished and ultimately starvation would result.

Experience has proven that a food for children in which the starch is wholly transformed into sugar before entering the stomach is far more apt to produce acid fermentation in the stomach, and consequently flatulence and indigestion and resulting bowel disorder, than the dextrine and soluble starch used in my preparation of soluble food. It is also well known that dextrine and soluble starch have the property of stimulating the peptic secretions of the stomach.

What I claim, and desire to secure by Letters Patent, is—

1. A dry powdered milk-wheat food compound in which the caseine of cow's milk is peptonized and partially digested, and thus brought to the same soluble form as human milk, so that it will not coagulate and form indigestible curds in the child's stomach.

2. A soluble food devoid of malt, composed of peptonized and partially-digested milk and flour, in which the starchy portion is converted into soluble starch and dextrine.

3. The soluble food compound in dry form, composed of about equal proportions of milk deprived of water and having the caseine peptonized and partially digested, so as to render it in digestibility like human milk, and flour in which the starchy portion is converted into soluble starch and dextrine.

4. Soluble food composed of partially-digested milk and flour having the starchy portion converted into soluble starch and dextrine reduced to a dry powdered form.

5. The process of manufacturing soluble food which consists in converting the starchy portion of the flour into dextrine and soluble starch and partially digesting milk with a suitable digestive ferment at the proper temperature, then arresting the digestive process by increasing to a temperature of suitable degree, to stop the action of the digestive agent, then concentrating the milk and mixing it with the prepared flour.

In testimony that I claim the foregoing as my own I affix my signature in presence of two witnesses.

JOHN CARNRICK.

Witnesses:
 O. E. DUFFY,
 JULIUS SOLGER.